(12) United States Patent
Nieuwland

(10) Patent No.: US 6,536,600 B1
(45) Date of Patent: Mar. 25, 2003

(54) FILTER DEVICE INCORPORATING A WOUND PAPER FILTER ELEMENT

(75) Inventor: Pierre Gerard Willem Nieuwland, Maassluis (NL)

(73) Assignee: NTZ International Holding BV, Maassluis (NL)

( * ) Notice: Subject to any disclaimer, the term of this patent is extended or adjusted under 35 U.S.C. 154(b) by 0 days.

(21) Appl. No.: 09/457,746

(22) Filed: Dec. 10, 1999

(30) Foreign Application Priority Data

Jul. 26, 1999 (NL) .............................. 1012700

(51) Int. Cl.⁷ .............................................. B01D 35/34
(52) U.S. Cl. ...................... 210/352; 210/437; 210/453; 210/455; 210/457; 210/497.1
(58) Field of Search ................................ 210/350, 352, 210/435, 437, 440, 453, 455, 457, 497.1, 441, 442, 450, 168, 171

(56) References Cited

U.S. PATENT DOCUMENTS

| | | | |
|---|---|---|---|
| 2,525,287 A | | 10/1950 | Cuno |
| 2,620,071 A | * | 12/1952 | Zenick ........................ 210/352 |
| 2,670,852 A | * | 3/1954 | Davidson .................... 210/442 |
| 5,290,445 A | | 3/1994 | Buttery |
| 5,374,355 A | * | 12/1994 | Habiger ...................... 210/440 |
| 5,484,523 A | * | 1/1996 | Bjornsson .................... 210/130 |
| 5,556,543 A | * | 9/1996 | Trabold ....................... 210/435 |

FOREIGN PATENT DOCUMENTS

| | | |
|---|---|---|
| EP | 0 426 064 | 5/1991 |
| EP | 0 678 318 | 10/1995 |

* cited by examiner

Primary Examiner—Matthew O. Savage
(74) Attorney, Agent, or Firm—Young & Thompson

(57) ABSTRACT

The invention relates to a filter device for microfiltration of oil, in particular for use in engines, automatic transmissions and hydraulic applications. The filter device comprises a tubular microfilter cartridge through which medium can flow in the transverse direction and which has open ends. This filter cartridge is accommodated in a filter chamber which is enclosed by a filter housing and is accommodated between two end closure elements, between which the filter cartridge is clamped under prestress. On their surface facing towards the filter cartridge the end closure elements are provided with at least one rib which extends in the transverse circumferential direction of the filter cartridge. The holding means comprise a spring which acts with prestress on one of the end closure elements, in such a manner that his closure element follows the end wall which it adjoins in the event of longitudinal expansion and also in the event of longitudinal contraction.

15 Claims, 2 Drawing Sheets

FILTER DEVICE INCORPORATING A WOUND PAPER FILTER ELEMENT

BACKGROUND OF THE INVENTION

The present invention relates to a filter device for microfiltration of oil, in particular for use in engines, automatic transmissions and hydraulic systems, the filter device comprising a tubular filter cartridge, through which medium can flow in the transverse direction and which is microporous, with open ends; a filter housing which encloses a filter chamber in which the filter cartridge is accommodated or can be accommodated in such a manner that the filter chamber is divided into a first space which lies outside the filter cartridge and a second space which lies inside the filter cartridge, which spaces are in communication with one another via the tubular wall, which acts as a filter, of the filter cartridge; the filter housing being provided with a first end closure element and a second end closure element for closing off the open ends of the filter cartridge and at least partially or completely overlapping the end walls of the filter cartridge; and the filter housing being provided with holding means for clamping the filter cartridge between the end closure elements under prestress.

DESCRIPTION OF THE RELATED ART

A filter device of this nature is known to German Patent DE-3,421,399 C2. The structure which is known from this patent uses a setscrew which prestresses the two end closure elements towards one another and thus clamps the tubular filter cartridge between the end closure elements.

Other designs are also known, for example designs in which the end walls of the filter housing are also the end closure elements for closing off the end walls of the filter cartridge, in which case one end wall is a fixed end wall and the other end wall is a screw cap which, in order for the filter cartridge to be replaced, can be unscrewed from the housing and then screwed back onto the housing. As a result of this screw cap being tightened to a sufficient extent, the filter cartridge is then clamped between the filter-housing end walls, which act as end closure elements.

In practice, however, it has been found that filter devices of this nature still allow some dirt to pass through. The applicant has ascertained that this "leakage" is attributable to slight changes in length which the filter cartridge experiences when the installation in which the filter device is fitted is started up and stopped. Specifically, the applicant has discovered the following:

During operation, the oil which is to be cleaned in the filter is fed to the outside of the filter cartridge at high pressure. Under the influence of the high pressure, the oil will then pass through the filter cartridge and, in the process, contamination will be removed. In filter cartridges of his nature, paper-like materials, felt-like materials and also glass-fibre materials are generally used as the filter material, in particular for microfilters. In view of the high pressure, these filter cartridges are often supported on the inside of the tube if the external pressure is higher than the internal pressure or on the outside of the tube if the internal pressure is higher than the external pressure. The relatively deformable filter material will then be compressed under the influence of the high pressure and will cause the length of the filter cartridge to increase slightly. When the installation in which the filter device is fitted is then stopped, and the oil pressure is therefore reduced again to a low pressure or to zero, this filter material will expand again in the transverse direction, and the length of the filter cartridge will decrease slightly. As a result, in this state, a small gap is formed between the end wall of the filter cartridge and the respective end closure element. When the installation in which the filter device is fitted is then started up again, and the oil is set in motion once again, with the result that the pressure rises again, there will initially be a moment at which contamination is forced through this gap from one side of the filter to the other side of the filter. Although this phenomenon is only transient, it nevertheless represents a not insignificant shortcoming of the filter device which, in the medium to long term, leads to damage to the installation in which the filter device is fitted.

SUMMARY OF THE INVENTION

Now that the cause of this long-standing problem has been detected, the object of the present invention is to provide a filter device of the type mentioned in the introduction in which "leakage" through the gap between the end wall of the filter cartridge and an associated end closure element is prevented or at least reduced. According to the present invention, the problem which has been recognized by the applicant can be solved by two different routes, which two different routes can also be followed in combination with one another, in which case they lead to an even better result than if these two routes are followed separately.

According to the first route, the problem which has been recognized by the applicant is overcome by the fact that at least one, preferably both, of the end closure elements, on its/their surface which faces towards the respective end wall of the filter cartridge, is/are provided with at least one rib which extends in the transverse circumferential direction of the filter cartridge. Under the influence of the holding means, ribs of this nature are pressed into the end wall of the filter cartridge and interrupt the gap which may be formed when the filter device ceases to operate, or at least when the oil pressure is eliminated. It will be clear that this measure stops fine contamination from being forced through the gap when the installation is started up. Since the pressure on the filter cartridge fills when the installation is stopped, the filter cartridge will moreover also tend to expand slightly in the transverse direction, in which case, if the ribs have already been retracted slightly from the end walls of the filter cartridge, it will still be able to adjoin these ribs under the influence of the reduction in length of the filter cartridge. However, it should be noted that even if, in the event of the rib which has been pressed into the end wall of the filter cartridge coming slightly free from the end wall and of the filter material no longer bearing fully against the rib, the gap which is formed when the oil pressure is eliminated will at any rate wind around the rib at the location of the rib, and this fact alone makes it difficult for dirt to be pressed through the gap.

In order to interrupt the gap along the entire end wall, it is advantageous according to the invention if the at least one rib extends without interruption and in the form of a continuous ring over the said end closure element.

To allow the rib to be pressed into the end wall of the filter cartridge with relative ease, it is advantageous according to the invention if the said at least one rib ends in a pointed edge which is directed towards the respective end wall of the filter cartridge. In this case, it is particularly advantageous if this pointed edge is designed as a sharp edge, as a cuffing edge, as it were.

To ensure that the at least one rib continues to extend all the way to the end wall of the filter cartridge at all times, it is advantageous, according to the invention, if the height of the at least one rib, in the longitudinal direction of the filter cartridge, is greater than a predetermined change in length which the filter cartridge will undergo at a predetermined maximum operating pressure of the oil.

According to a second route, which can therefore be regarded as being entirely separate from hte first route, but is preferably to be regarded in combination with the first route, the problem which the applicant has recognized is solved by the fact that the holding means comprise a spring which acts with prestress on one of the end closure elements, in such a manner that this closure element follows the end wall which it adjoins in the event of longitudinal expansion and/or longitudinal contraction of the filter cartridge. It is thus possible to ensure that the two closure elements continue to bear in a sealed manner against the end walls at all times, under the action of the prestressed spring.

According to an advantageous embodiment of the invention, the spring is a compression spring which is accommodated, with prestress, between, on the one hand, that side of the said one end closure element which faces away from the filter cartridge and, on the other hand, the wall of the filter housing.

According to an advantageous embodiment of the invention, in this case, the prestress of the spring is at least 3 kg/cm, preferably at least 5 kg/cm, and at most 9 kg/cm, preferably at most 7 kg/cm.

In both solutions (routes) according to the invention, it is advantageous, according to the invention, if the end closure elements are provided, on their side which faces towards the filter cartridge, with a sealing plug which can be fitted tightly into the interior of the filter cartridge. This, on the one hand, ensures that the filter cartridge is securely fixed in the chamber of the filter housing and, on the other hand, provides yet a further seal between the inner wall of the filter cartridge and the sealing plug at the location of the open ends.

According to a further advantageous embodiment of the invention, the filter cartridge comprises a perforated winding core with paper, in particular filter paper, wound onto it.

BRIEF DESCRIPTION OF THE DRAWINGS

The invention furthermore relates to a filter housing which is intended for a filter device according to the invention.

In the following text, the present invention will be explained in more detail with reference to an exemplary embodiment which is depicted in the drawing, in which.

DESCRIPTION OF THE PREFERRED EMBODIMENTS

Figure 1:
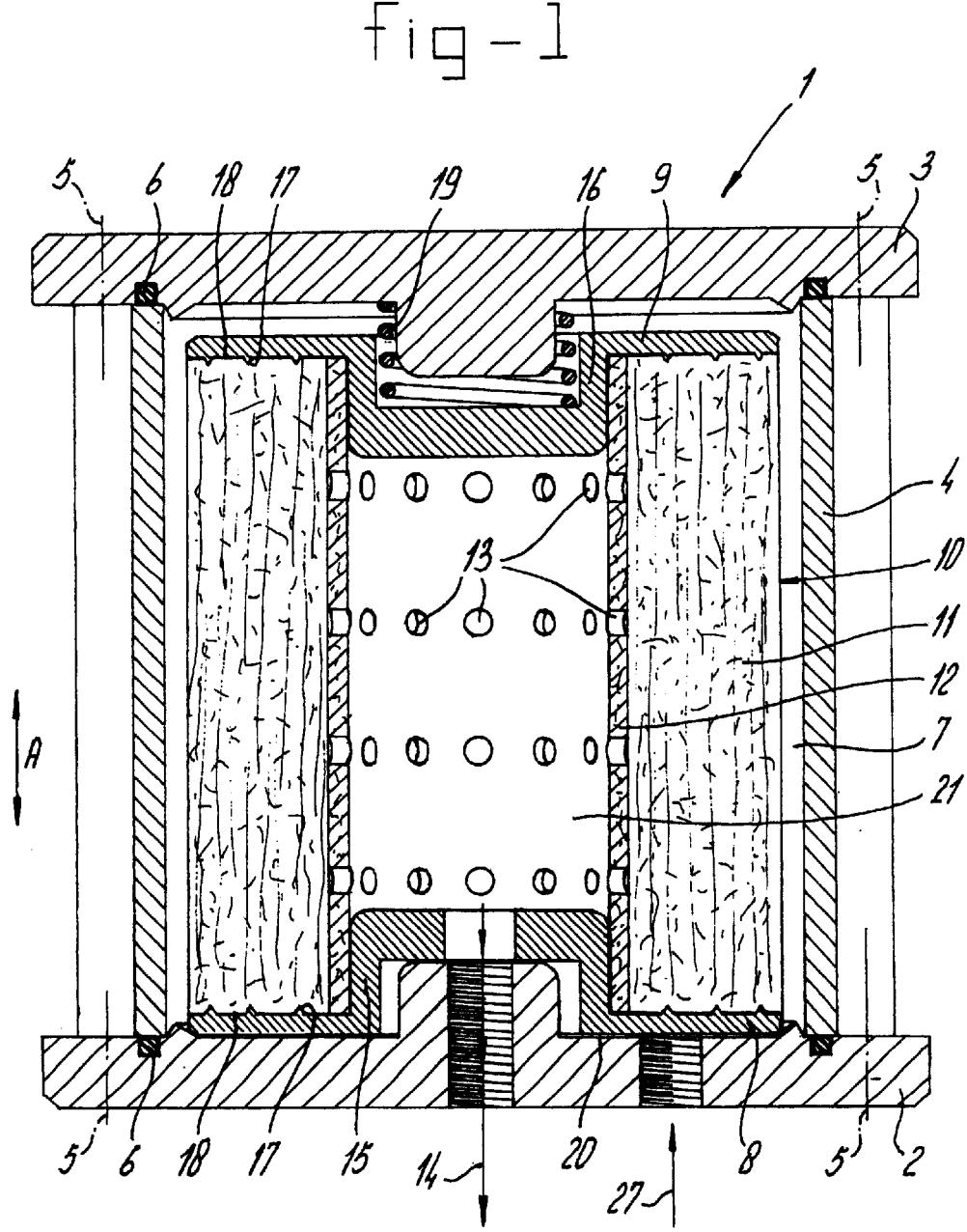
FIG. 1 shows a diagrammatic, longitudinal sectional view of a filter device according to the invention.
Figure 2:
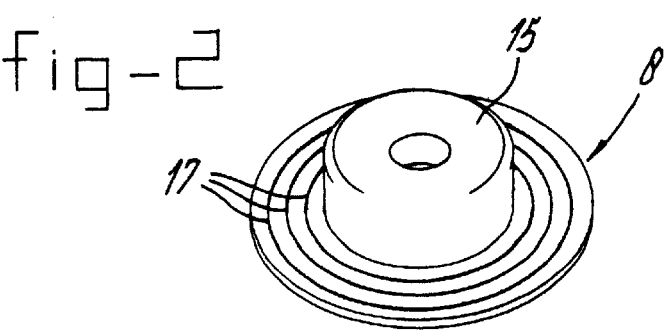
FIG. 2 shows a perspective view of an end closure element for a filter device according to the invention.

The filter device 1 according to the invention comprises a filter housing which is formed by a bottom plate 2, a top plate 3 and a cylindrical wall 4 which is situated between these two plates. The bottom plate 2 and top plate 3 are attached to the cylindrical wall 4 by means of screws, which are diagrammatically represented by axes 5. In order to ensure that there is a seal between the bottom plate 2 and cylindrical wall 4 and between top plate 3 and cylindrical wall 4, O-shaped sealing rings 6 are provided.

Inside the housing, there is a first, or bottom end closure element 8, which is fixedly mounted, by means of a drilled-through banjo bolt provided with two sealing rings, on the bottom plate 2, and a second, or top end closure element 9. There is a filter cartridge 10 between the end closure elements 8 and 9. The filter cartridge 10 comprises filter paper 11 which is wound onto a winding core 12 and may comprise a very large number of thin layers of paper. The winding core 12 is provided with perforations 13.

Via feed opening 27, oil is supplied at high pressure and then, as a result of a gap 20 between the underside of the end closure element 8 and plate 2, passes into a first space 7, which lies outside the filter cartridge 10, of the filter chamber. Then, as a result of the high pressure, this oil is pressed in the radial direction from the outside inwards, through the wound layers of filter paper 11, in order to reach the interior of the filter cartridge 10 via the perforations 13, which interior forms the second space 21, lying inside the filter cartridge, of the filter chamber, From this second space 21, the filtered oil can then be discharged from the filter device via outlet duct 14.

In order to be able to centre the filter cartridge 10 between an end closure elements 8 and 9 and to be able to seal these end closure elements 8 and 9 on the inner wall of the winding core 12, the end closure elements 8 and 9 are provided with sealing plugs 15 and 16 which can be fitted tightly into the interior of the filter cartridge 10.

The two end closure elements 8 and 9 which, apart from the passage opening for the outlet duct 14 in the closure element 8, are of substantially identical design, each have three ribs 17 which project in the direction of the respective end wall of the filter cartridge and extend without interruption, in the form of a continuous ring, over the respective end closure element. As can be seen from FIG. 1, these ribs 17 are designed with a pointed, as it were sharp, edge which is directed into and towards the respective end wall of the filter cartridge. This pointed edge helps the ribs 17 to penetrate into the relatively soft filter material.

If a small radial gap should form between an end closure element 8 and/or 9 and the respective end wall 18 of the filter material 11, the ribs 17, which project essentially in the axial direction, will form an obstacle in the radial gap and will thus make it difficult for contamination to pass through the said radial gap.

Furthermore, the filter housing contains a compression spring 19 which acts between the top plate 3, on the one hand, and the top end closure element 9, on the other hand, and presses the end closure element 9 against the top end wall 18 of the filter material 11 with a prestress of from 5 to 7 kg/cm, with the result that the bottom end wall 18 of this filter material 11 is pressed against the bottom closure element 8. It will be clear that if the filter material 11 then expands or contracts in the axial direction A, the seal provided by the closure elements 8 and 9 will be maintained as a result of the spring 19. If a prestressed spring, such as the compression spring 19, is used, the sealing action of the end closure element 8 and 9 on the end walls 18 of the filter material is improved by the use of the ribs 11, which could also be used separately from a prestressed spring of this nature in order to improve the seal.

The filter cartridge can be replaced by unscrewing the screws or bolts 5 with which the top plate 3 is attached and then removing this top plate 3.

Figure 3:
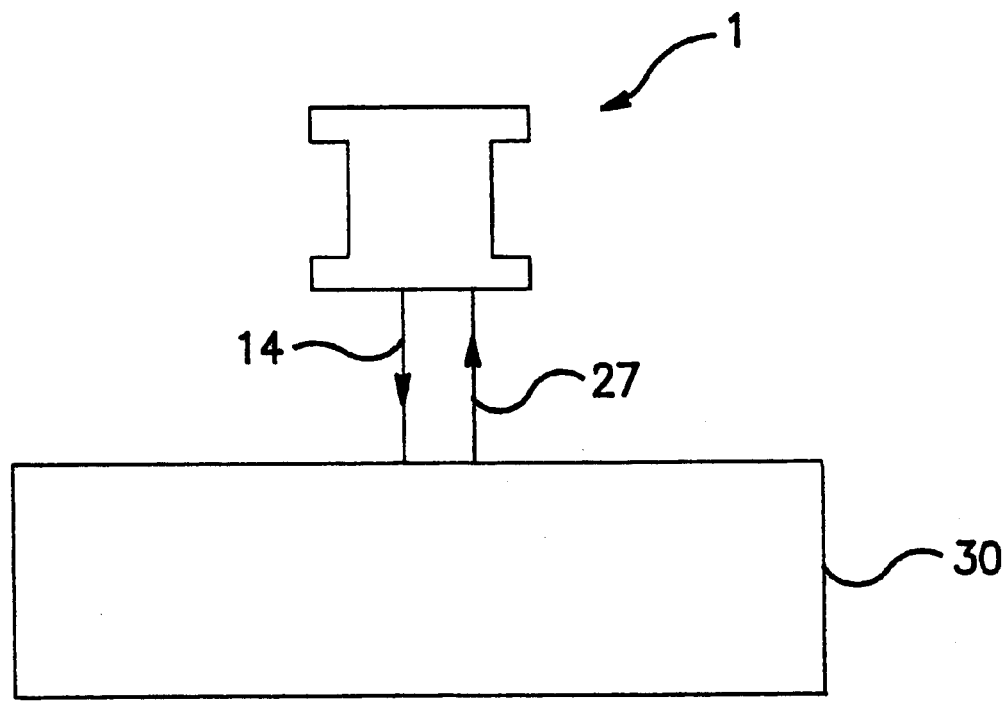
FIG. 3 shows a schematic representation of an embodiment of the present invention.

FIG. 3 shows the filter device 1 having an outlet tube 14 and an inlet tube 27 connected to block 30 representing the engine, transmission, and hydraulic system, respectively.

The filter device according to the invention can be used, inter alia, as a so-called side flow filter in an oil-filter device for engines, such as diesel, lpg or petrol engines, automatic transmissions and hydraulic applications

What is claimed is:

1. A filter device for micro-filtration of oil, comprising:
   a tubular filter cartridge having a filtering tubular wall running in a longitudinal direction, open ends and a transverse direction,
   the filter cartridge including a perforated winding core configured so that oil flows in the transverse direction and a filter paper wound onto the winding core comprised of plural paper layers,
   the winding core enabling the filter paper to change in axial length and radial thickness as in response to changes in oil pressure,
   the filter paper having a tendency to undergo a change from a first length in the axial longitudinal direction when not exposed to an operating oil pressure to a second greater length when exposed to a predetermined maximum operating oil pressure,
   a difference between the first length and the second length being a predetermined change in length due to being subjected to the predetermined maximum operating oil pressure;
   a filter chamber accommodating the filter cartridge including the filter paper; and
   a filter housing enclosing the filter chamber and dividing the filter chamber into a first space located on an outside of the filter cartridge and a second space located on an inside of the filter cartridge, the first and second spaces being in fluid communication via the tubular wall, the filter housing including
      a first end closure element and a second end closure element arranged to close off the open ends of the filter cartridge and to overlap end walls of the filter cartridge, and
      holding means for clamping, under prestress, the filter cartridge between the first and second end closure elements,
   each of the first end closure element and the second end closure element having a first side adjacent the filter cartridge and a second side remote from the filter cartridge,
   the holding means comprising a spring exerting a prestress on one of the first and second end closure elements such that the one closure element follows and remains in contact with a corresponding cartridge filter open end during any expansion or contraction in the longitudinal direction of the filter paper,
   the first sides of the first and second end closure elements having at least one rib extending away from the first sides and toward the filter paper of the filter cartridge, the at least one rib forming an unbroken, continuous ring extending into the layers of the filter paper defining the filtering tubular wall,
   the at least one rib having a height greater than the filter paper change in length due to being subjected to the predetermined maximum operating oil pressure.

2. The filter of claim 1, wherein the at least one rib comprises a pointed edge.

3. The filter of claim 1, wherein the spring is a compression spring and is arranged, with compressive prestress, contacting the second side of the one closure element and an end wall of the filter housing.

4. The filter of claim 1, wherein the spring prestress is at least 3 kg/cm.

5. The filter of claim 4, wherein the spring prestress is at least 5 kg/cm and at most 9 kg/cm.

6. The filter of claim 5, wherein the spring prestress is at most 7 kg/cm.

7. The filter of claim 1, wherein the first and second end closure elements each further comprise a sealing plug contactingly fitted into the inside of the filter cartridge.

8. The filter of claim 1 wherein the tubular filter is micro-porous.

9. An engine equipped with the filter device of claim 1.

10. An automatic transmission equipped with the filter device of claim 1.

11. An hydraulic system provided with the filter device of claim 1.

12. The filter device of claim 1, wherein the filter paper has a first radial thickness when not exposed to an operating oil pressure and a second lesser radial thickness when exposed to a predetermined maximum operating oil pressure, a difference between the first thickness and the second thickness being a change due to being subjected to an increase in operating oil pressure.

13. A filter housing comprising:
   a filter chamber accommodating a tubular filter cartridge having a filtering tubular wall running in a longitudinal direction, open ends and a transverse direction,
   the filter cartridge including a perforated winding core configured so that oil flows in the transverse direction and a filter paper wound onto the winding core comprised of a large number of thin layers of paper, the winding core enabling the filter paper to change in axial length and radial thickness as in response to changes in oil pressure,
   the filter paper having a tendency to undergo a change from a first length in the axial longitudinal direction when not exposed to an oil pressure to a second greater length when exposed to a predetermined maximum operating oil pressure, a difference between the first length and the second length being a predetermined change in length due to being subjected to the predetermined maximum operating oil pressure,
   the filter housing enclosing the filter chamber and dividing the filter chamber into a first space located on an outside of the filter cartridge and a second space located on an inside of the filter cartridge, the first and second spaces being in fluid communication via the tubular wall,
   the filter housing further including
      a first end closure element and a second end closure element arranged to close off the open ends of the filter cartridge and to overlap end walls of the filter cartridge, and
      holding means for clamping, under prestress, the filter cartridge between the first and second end closure elements,
   the holding means comprising a spring exerting a prestress on one of the first and second end closure elements ensuring that the one closure element follows and remains in contact with a corresponding cartridge filter open end during any expansion or contraction in the longitudinal direction of the filter paper,
   each of the first end closure element and the second end closure element having a first side adjacent the filter cartridge and a second side remote from the filter cartridge, the first sides of the first and second end closure elements having at least one rib extending away from the first sides and toward the filter paper of the filter cartridge, the at least one rib forming an unbroken, continuous ring extending into the into the layers of the filter paper, the at least one rib having a height greater than the filter cartridge change in length due to being subjected to the predetermined maximum operating oil pressure.

14. The filter housing of claim 13, wherein the filter housing is connected to an engine.

15. The filter device of claim 13, wherein the filter paper has a first radial thickness when not exposed to an operating oil pressure and a second lesser radial thickness when exposed to a predetermined maximum operating oil pressure, a difference between the first thickness and the second thickness being a change due to being subjected to an increase in operating oil pressure.

* * * * *